United States Patent
Thrane et al.

(10) Patent No.: US 9,491,952 B2
(45) Date of Patent: Nov. 15, 2016

(54) METHOD, A SYSTEM AND A GUIDE ASSEMBLY FOR SEPARATING VISCERA SETS EVISCERATED FROM SLAUGHTERED POULTRY

(71) Applicant: LINCO Food Systems A/S, Trige (DK)

(72) Inventors: Uffe Thrane, Hammel (DK); Jonas Jensen, Hobro (DK)

(73) Assignee: LINCO FOOD SYSTEMS A/S, Trige (DK)

( * ) Notice: Subject to any disclaimer, the term of this patent is extended or adjusted under 35 U.S.C. 154(b) by 0 days.

(21) Appl. No.: 14/891,256

(22) PCT Filed: May 14, 2014

(86) PCT No.: PCT/DK2014/050135
§ 371 (c)(1),
(2) Date: Nov. 13, 2015

(87) PCT Pub. No.: WO2014/183769
PCT Pub. Date: Nov. 20, 2014

(65) Prior Publication Data
US 2016/0095327 A1 Apr. 7, 2016

(30) Foreign Application Priority Data
May 14, 2013 (EP) .................................... 13167583

(51) Int. Cl.
*A22C 21/00* (2006.01)
*A22C 21/06* (2006.01)

(52) U.S. Cl.
CPC ...................... *A22C 21/06* (2013.01)

(58) Field of Classification Search
CPC ................ A22C 21/06; A22C 21/0092; A22C 21/0038; A22C 17/14
(Continued)

(56) References Cited

U.S. PATENT DOCUMENTS

| 4,019,222 A | * | 4/1977 | Scheier | A22C 21/06 452/117 |
| 4,538,325 A | * | 9/1985 | Harben, Jr. | A22C 17/14 452/111 |

(Continued)

FOREIGN PATENT DOCUMENTS

| EP | 0587253 A2 | 3/1994 |
| WO | WO-0033661 A1 | 6/2000 |
| WO | WO-2005036973 A1 | 4/2005 |

OTHER PUBLICATIONS

International Search Report of PCT/DK2014/050135 filed Jun. 30, 2014.

*Primary Examiner* — Richard Price, Jr.
(74) *Attorney, Agent, or Firm* — FisherBroyles, LLP; Robert Kinberg (57) ABSTRACT

Disclosed is a method and a system for separating a viscera set eviscerated from slaughtered poultry and held by a viscera holder of a viscera conveyer in manner whereby at least the liver, the intestines and the gallbladder are suspended below the viscera holder. The method comprises the steps of: arranging the viscera set in an elongate opening of a guide member and separating the intestines and the gallbladder from the remaining viscera set. The intestines and the gallbladder are separated from the remaining viscera set while at least the liver rests on a separation support surface of the guide member, arranged with an angle relative to the horizontal plane. A guide assembly having two movable parts for use in such method/system is further disclosed.

22 Claims, 6 Drawing Sheets

(58) Field of Classification Search
USPC ........ 452/106, 107, 109, 111, 112, 115, 117, 452/120, 123
See application file for complete search history.

(56) References Cited

U.S. PATENT DOCUMENTS

| | | | | |
|---|---|---|---|---|
| RE32,402 E | * | 4/1987 | Graham | A22C 21/06 |
| | | | | 452/117 |
| 5,041,053 A | * | 8/1991 | Ellis | A22C 21/06 |
| | | | | 452/106 |
| 5,186,678 A | * | 2/1993 | Conner | A22C 21/06 |
| | | | | 452/106 |
| 5,707,280 A | * | 1/1998 | Tieleman | A22C 21/06 |
| | | | | 452/117 |
| 2009/0042497 A1 | * | 2/2009 | Sorensen | A22C 21/06 |
| | | | | 452/117 |

\* cited by examiner

METHOD, A SYSTEM AND A GUIDE ASSEMBLY FOR SEPARATING VISCERA SETS EVISCERATED FROM SLAUGHTERED POULTRY

CROSS-REFERENCE TO RELATED APPLICATION

This application is a U.S. National Stage of International Application No. PCT/DK2014/050135, filed May 14, 2014, designating the United States and claiming priority to European Patent Application No. 13167583.7, filed May 14, 2013, the priority of which is claimed herein.

FIELD OF THE INVENTION

A method, a system and a guide assembly for separating viscera sets eviscerated from slaughtered poultry.

The present invention relates to a method and a system for separating a viscera set eviscerated from slaughtered poultry. Additionally, the pre-sent invention relates to a support assembly suitable for use in such a method and/or system.

Viscera separation is an important part of the poultry slaughtering process. The two most important parameters are speed and quality. Modern poultry slaughtering systems are capable of operating at processing speeds of above 200 birds per minute. As the value of the systems is directly proportional with their processing speed, even a small increase in the processing speed may be very valuable. However, an increase in the processing speed should not result in a corresponding decrease in the quality of the separation.

One particularly important aspect of the viscera separation process is the separation of eatable parts from not eatable parts. Typically, the intestines and gallbladder are perceived as not eatable parts, whereas the liver, heart and gizzard are perceived as eatable parts. Especially, the separation of the gallbladder from the liver is challenging, as the gallbladder contains bile that may contaminate the eatable parts of the viscera set if the separation is not done properly.

WO0033661 discloses a method and an apparatus for separating viscera sets, wherein viscera sets suspended from holders are inserted between stationary horizontal guide plates in such a way that the proventriculus, gizzard, heart, lung and liver are disposed over the guide plates, and that the intestine pack including the gallbladder is disposed at the underside of the guide plates. The intestine pack is clamped between clip brackets rotating about a reversing wheel. The clip brackets are displaced downward for exerting a downward directed pull on the intestine pack while the intestine pack passes by a rotating cutter, cutting free the intestine pack. The remaining parts of the viscera set, including proventriculus, gizzard, heart, lungs and liver, are passed on to a second apparatus for further separation.

This method of separation works very well compared to other prior art methods, but in some cases it results in a part of the liver being pulled below the guide plates, where it is cut off and discarded together with the gallbladder and the intestines, and in other cases the gallbladder is either punctured or not separated from the liver. This is particularly the case when the natural variations in the different parts of the viscera set are relatively high.

SUMMARY OF THE INVENTION

Thus, it is the object of the invention to provide a method and/or system allowing a more precise separation of the intestines and gallbladder from the remaining viscera set at high processing speeds.

In a first aspect of the invention this object is achieved with a method for separating a viscera set eviscerated from slaughtered poultry and held by a viscera holder on a viscera conveyer in manner whereby at least the liver, the intestines and the gallbladder are suspended below said viscera holder, said method comprising the steps of:

arranging said viscera set in an elongate opening of a guide member in a manner whereby the intestines and the gallbladder are suspended below said guide member and the liver and gizzard are positioned above said guide member; and separating the intestines and the gallbladder from the remaining viscera set, wherein the guide member is moved during one or both of the above steps, wherein the intestines and the gallbladder is separated from the remaining viscera set while at least said liver rests on a separation support surface of said guide member, and wherein said separation support surface is arranged with an angle relative to a horizontal plane.

The movement of the guide member may be in substantially the same direction as the direction of travel of the viscera conveyor thereby minimizing the force affecting the viscera set when coming into contact with the guide member, it may be towards the viscera holder to bring it into contact with the liver, and/or it may be in a transverse direction in relation to the intestines to arrange them in the opening. Any of these movements will contribute to a precise processing of the viscera set at a high processing speed as will be explained in detail below.

The angling of the separation support surface allows the liver and gizzard to slide towards the lower end of the elongate opening, whereby the gall bladder is coming out of the opening on the underside of the guide member. The elongate opening preferably has a central length axis, which is parallel to the direction of slope of the separation support surface.

The angling may also cause the viscera set to turn from an initial more or less random orientation to a second orientation so that it is oriented in a manner allowing the gallbladder and intestines to be separated more precisely from the remaining viscera set, even at high processing speeds. Thereby the amount of liver tissue, which is being discarded, and the risk of contamination caused by cuts in the gall bladder are reduced.

The separation support surface is preferably angled relative to the horizontal plane with an angle between 5 degrees and 85 degrees, preferably between 15 degrees and 60 degrees.

The term "rests" it not to be understood in the very strict sense that the liver is absolutely stationary in relation to the separation support surface. Some movement may be involved due to the very high processing speeds in modern poultry processing. The movement should, however, be limited so that the relative velocity of the liver in relation to the separation support surface is less than 25%, preferably less than 10%, of the speed of the viscera holder at the time when the intestines and gallbladder are separated from the remaining viscera set.

In some embodiments, the step of arranging said viscera set in said elongate opening of said guide member comprises:

arranging the viscera holder at a first distance above the guide member; and moving said guide member and/or said viscera holder so that they are arranged with a second distance, smaller than said first distance, whereby said liver is supported by a separation support surface of said guide member.

This allows the viscera set to be arranged in the elongate opening in a gentle manner, thereby allowing higher processing speeds.

In a presently preferred embodiment, said guide member and said viscera holder is brought closer together by keeping the viscera holder substantially in the same horizontal plane and moving said guide member upwards. This allows the use of a viscera holder conveyor running in one horizontal level.

To provide the angling, the separation support surface may be tilted in a direction perpendicular to the movement of the viscera holder, i.e. the separation support surface may be rotated about an axis being parallel with the direction of movement of the viscera holder.

In some embodiments, said guide member and said viscera holder is moving as a pair, at least for a distance. The guide member and the viscera holder may move as a pair by having an approximately equal velocity in the horizontal plane, i.e. they may move closer to each other or further away from each other, but they will approximately follow each other when viewed from above. To achieve this, the guide members are preferably mounted with substantially the same mutual distance as the viscera holders.

The elongate opening may be simply a hole in the separation support surface of the guide member, but it may also be formed by a forked front of the guide member. In the latter case, the step of arranging said viscera set in the guide member may comprise swinging or rotating said guide member to come in around or beneath the viscera set.

The guide member may also comprise a first part and a second part, said first and second parts being moveable between a first open position, wherein said guide member is configured to receive said viscera set and wherein said first part and said second part are relatively far apart, and a second closed position, wherein the first part and the second part are close to each other. When being moved from the open position to the closed position, one or both parts are moving in a horizontal or inclined direction, so as to engage the hanging viscera set from the sides, i.e. in a transverse direction with respect to the extend of the intestines when hanging from the viscera holder. This allows the guide member to be arranged around the viscera set, so that it is arranged in the elongate opening in a gentle manner.

One or more recesses in the first and/or second part of the guide member may form the elongate opening when the guide member is brought into the second position.

In some embodiments, the first part and the second part is positioned in different planes and/or the separation support surface is tilted towards either the leading or the trailing edge of the guide member seen in the direction of travel of the viscera conveyor.

The step of arranging said viscera set in said elongate opening of said guide member may comprise gripping a first part of the intestines suspended below said guide member by a gripping member. The gripping may simply fixate the intestines so that an upwards movement of the guide member causes a stretching of the intestines as the gizzard and liver are forced upwards, but in some embodiments, said gripping member is horizontally and/or vertically displaced relative to said viscera holder to inflict an active pull on the intestines.

In some embodiments, said gripping member is displaced relative to said viscera holder in a manner whereby said intestines positioned between said gripping member and said guide member are arranged along an axis being approximately parallel with a normal vector of said separation support surface, i.e. perpendicular to the separation support surface. This provides the largest possible distance between the liver and the gallbladder, thus allowing the separation to be performed even more precisely.

The gripping member may be displaced relative to said viscera holder in two or more steps, possibly even in an oscillating manner.

In some embodiments, said gripping member releases said intestines after a first vertical downward displacement, grips a second part of the intestines and performs a second vertical downward displacement, whereby the intestines are pulled further through the elongate opening of the guide member.

The gripping member may be displaced both horizontally and vertically or even swung.

A vertical movement of the gripping member and/or the guide member may be provided by displacing them on an assembly frame.

In some embodiments, at least one organ, such as the heart, the lungs or the gizzard, is removed from the viscera set before the intestines and the gallbladder are separated and/or the spleen is separated together with the intestines and the gallbladder.

For removal of the spleen together with the intestines and the gallbladder, the spleen may be pulled through the elongate opening by the gripping member or by gravity and the dimensions and/or shape of the elongate opening may then have to be slightly different than when separating only the intestines and the gallbladder.

The intestines and the gallbladder may be separated from the remaining viscera set by cutting, using for example a blade positioned below said guide member, by edges of the elongate opening of the guide member being moved together like a pair of scissors, and/or by a pull on the intestines and/or gallbladder. It is presently envisaged to use a rotating blade or cutter.

In some embodiments, the movements of the guide member and/or gripping member is controlled by control members fixed thereon and running in stationary guide tracks.

In a second aspect of the invention the object is achieved with a system for separating viscera sets eviscerated from slaughtered poultry, said system comprising a guide member and viscera conveyer comprising a plurality of viscera holders, wherein each viscera holder is configured to hold a viscera set in manner whereby at least the liver, the intestines, and the gallbladder are suspended below said viscera holder;

said guide member comprises an elongate opening and is configured to receive a viscera set, held by a viscera holder, in said elongate opening in a manner whereby the intestines and the gallbladder are suspended below said guide member and the liver and gizzard are positioned above said guide member; and said system is configured to separate the intestines and the gallbladder from the remaining viscera set wherein the guide member is moveable, wherein said system is configured to separate the intestines and the gallbladder from the remaining viscera set while at least said liver rests on a separation support surface of said guide member, and wherein said separation support surface is arranged with an angle relative to a horizontal plane.

As described for the method above, the separation support surface is preferably angled relative to the horizontal plane with an angle between 5 degrees and 85 degrees, preferably between 15 degrees and 60 degrees.

Likewise, in some embodiments, said system comprises a plurality of guide members each guide member being configured to move with a viscera holder as a pair at least for a distance, thus minimizing the impact between the viscera set and the guide member.

As described with reference to the method, said viscera holder is preferably adapted for moving substantially in the one horizontal plane and said guide member preferably adapted for being moved upwards towards the viscera holder, so that the liver comes to rest on a separation support surface of said guide member. A downwards movement of the viscera holder is, how-ever, not excluded and the guide member therefore does not have to be up-wards moveable.

Here too, the guide member advantageously comprises a first part and a second part, which are moveable between an open and a closed position as described in detail above. An edge of the first part may abut an edge of the second part when said first part and second part are in said second position, and one or more recesses in one or both parts of the guide member may form the elongate opening.

In some embodiments, said guide member is provided with upstanding flanges adapted for keeping particular the liver in place on the separation support surface. Such flanges may lower the risk of the viscera set coming to hang over the edge of the guide member as a result of the movement thereof.

The elongate opening may be elliptical or rectangular, but it may also have a wedge shape. This may allow the viscera set to be more easily arranged in the elongate opening, as it can be received in the wider part of the wedge shaped opening and then move towards the more narrow part.

In some embodiments, the elongate opening is formed by a forked front of the guide member, and the guide member may then be configured to receive said viscera set in said forked front of said guide member by being rotated in beneath or around the viscera set.

An average width of the elongate opening between 10 mm and 20 mm, preferably 13 mm and 15 mm, have been found to be suitable when in-tending to separate only the intestines and the gallbladder from the viscera set, but if also intending to separate the spleen, the opening may need to be slightly wider and/or have a different shape.

In some embodiments, the separation support surface is further angled towards either the leading edge of the guide member or the trailing edge of the guide member.

The system may further comprise a plurality of gripping members wherein each configured to grip a part of the intestines suspended below said guide member, each gripping member preferably being adapted for moving with a particular viscera holder as described above.

A gripping member and a guide member may be movably arranged on an assembly frame, which may comprise a pair of rods serving to guide an upwards or downwards movement of these members, and several such assembly frames may be arranged on an apparatus frame, preferably in a movable manner.

In some embodiments, said gripping members are configured to be displaced horizontal and/or vertically relative to said viscera holder and/or to be displaced relative to said viscera holder in an oscillating manner. Possibly, said gripping member is configured to be moved in a manner whereby said intestines positioned between said gripping member and said guide member are arranged along an axis being approximately parallel with a normal vector of said separation support surface.

The guide member and/or the gripping member may be provided with control members adapted for running in stationary guide tracks on an apparatus frame.

In a third aspect of the invention the object is achieved with a guide assembly for use in a system for separating viscera sets eviscerated from slaughtered poultry said guide assembly comprising a guide member comprising a separation support surface having an elongate opening for receiving a viscera set in a manner whereby at least the intestines and the gallbladder are suspended below said guide member and the liver and gizzard are positioned above said guide member, wherein said separation support surface of said guide member is arranged with an angled relative to the horizontal plane, and said guide member comprises a first part and a second part, wherein said first part and second part is movable arranged between a first position for receiving a viscera set where said first part and said second part are relatively far apart, and a second position for supporting said viscera set in a manner whereby at least the intestines and the gallbladder are suspended below said guide member and the liver and gizzard are positioned above said guide member.

The advantages and additional features, which have been described above with reference to the system and the method and particularly the guide member of the system above, also applies to the guide assembly and its use. As an example the preferred angle of the separation support surface is between 15 degrees and 60 degrees in the mounted state of the guide assembly, and the elongate opening may be formed by one or more recesses in one or both parts of the guide member, when the guide member is in the second closed position.

In some embodiments, said guide assembly further comprises a assembly frame and said guide member is vertically movably arranged on said assembly frame between a first vertical position for receiving a viscera set and a second vertical position above said first vertical position for supporting at least the liver.

It is noted that whenever reference is made to relative positions such as "above", "below", "upwards" or "downwards" these reference are to be understood as applying to the guide assembly when mounted and in its intended use position. This also applies to any such references used in the description of the method and system above.

The guide assembly may further comprise a gripping member arranged on said assembly frame below said guide member for gripping a part of the intestines suspended below said guide member as described in details with reference to the system above.

By arranging the guide member and the gripping member on a common assembly frame, their movements may be easily synchronized. A guide assembly comprising an assembly frame with a guide member and possibly a gripping member mounted thereon may be supplied and replaced as a unit, making the construction of a system according to the invention as well as maintenance and repair relatively easy. This is particularly so if the members connecting the guide assembly to an apparatus frame, such as control members adapted for cooperating with guide tracks or the like on the apparatus frame, are made in a manner already known from other systems used in poultry slaughter houses, for example as wheels adapted for running in the guide tracks. Said guide assembly may thus be adapted for use in a system as disclosed in relation to the second aspect of the invention.

The different aspects of the present invention can be implemented in different ways including methods and systems for separating viscera sets, and a guide assembly that may be used in such systems/methods as de-scribed above and in the following. Each of these embodiments yield one or more of the benefits and advantages described in connection with at least one of the aspects described above and/or disclosed in the dependant claims. Furthermore, it will be appreciated that embodiments described in connection with one of the aspects described herein may equally be applied to the other aspects.

BRIEF DESCRIPTION OF THE DRAWINGS

In the following the invention will be described in closer detail with reference to embodiments shown in the drawing, where.

DETAILED DESCRIPTION

Figure 1:
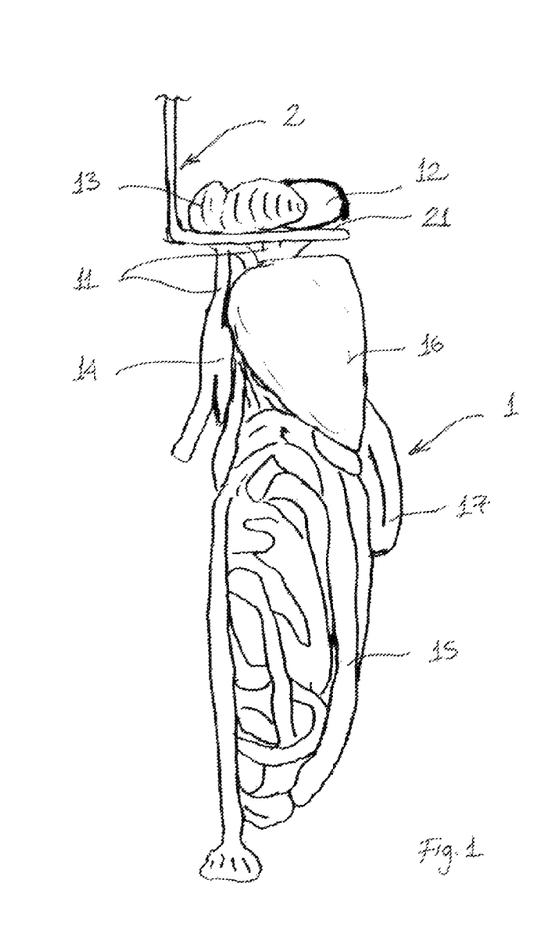
FIG. 1 shows a viscera set held by a viscera holder seen from the side.
Figure 2:
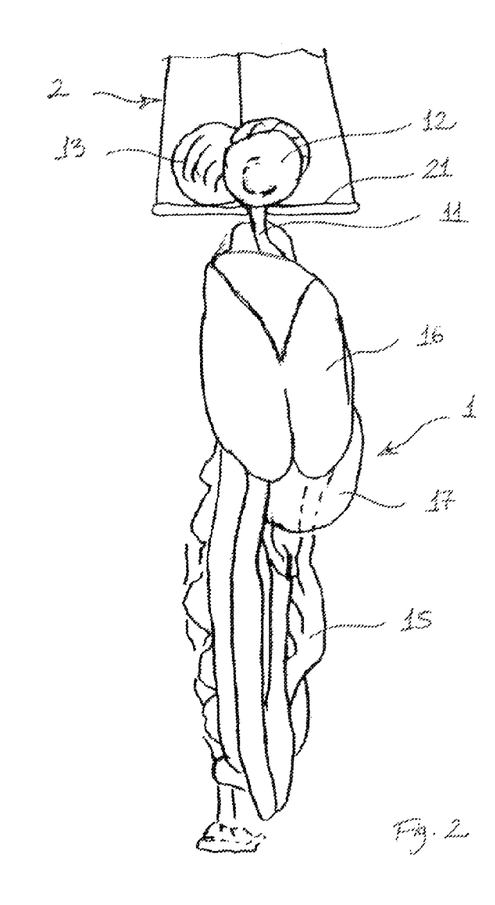
FIG. 2 corresponds to FIG. 1, but seen from the front.

A viscera set 1 from a chicken is shown hanging from a viscera holder 2 in FIGS. 1 and 2. In this case the viscera holder is of a type with two mutually moveable parts and has gripped the esophagus 11 below the heart 12, so that the heart and the lungs 13 are lying on an upper surface 21 of the viscera holder, but the invention works equally well when the esophagus is held between the heart 12 and the crop 14. Likewise it is to be understood that the viscera holder does not have to clamp the esophagus. It is also noted that though a chicken viscera set is here used as an example, viscera sets from other birds such as ducks, gees, turkeys, pigeons or quails may be held and processed in substantially the same manner.

In the preferred embodiment a series of viscera holders 2 are mounted on an overhead conveyor as is common practice in poultry slaughterhouses and receiving one viscera set at a time, either directly from an eviscerator or from an intermediate unit or conveyor, which may for example serve as a buffer.

Figure 3:
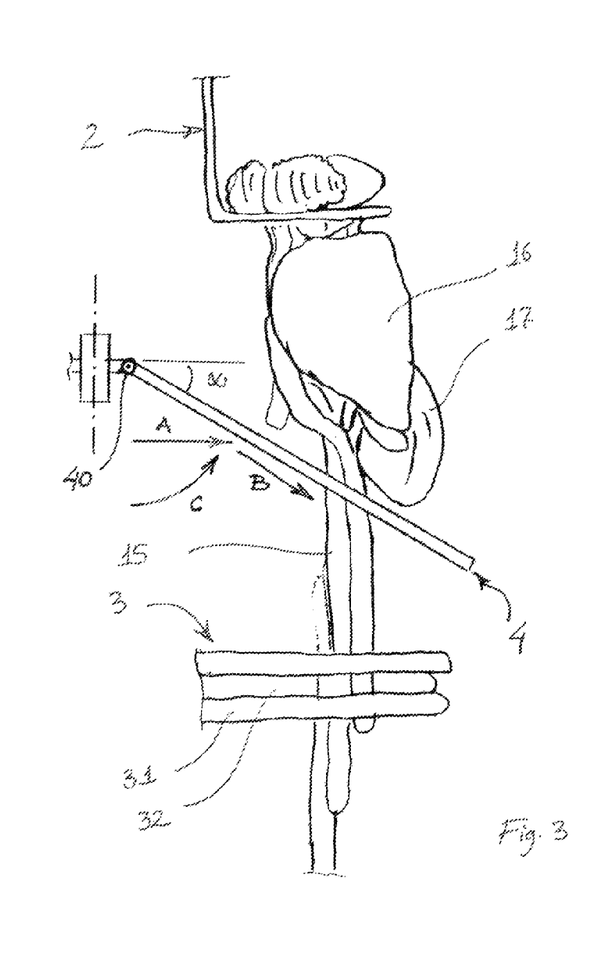
FIG. 3 corresponds to FIG. 1, but with the intestines held by a gripping member and where a guide member have been arranged around the intestines above the gripping member, FIG. 4 corresponds to FIG. 3, but seen from the front, FIG. 5 corresponds to FIG. 3, but with the guide member in a higher relative position and also showing a cutter, FIG. 6 corresponds to FIG. 5, but seen from the front.
Figure 4:
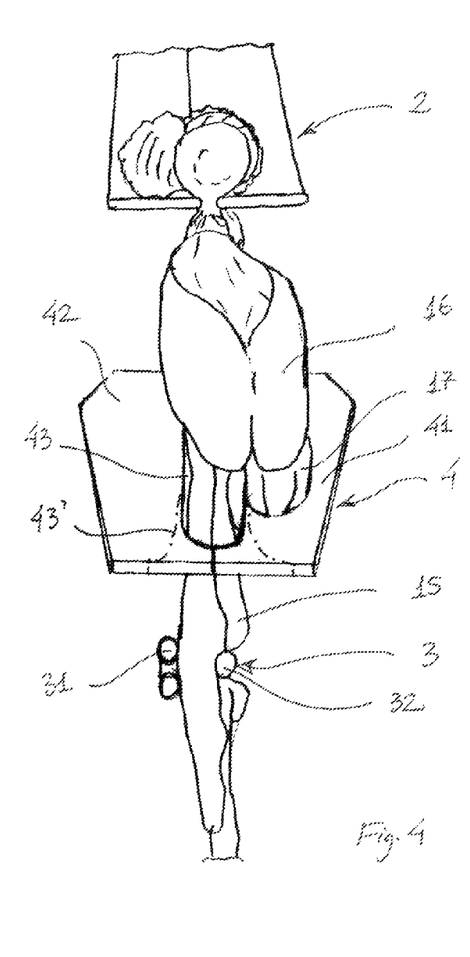

Turning now to FIGS. 3 and 4 the intestines 15 have been gripped by a gripping member 3 and stretched so that only the uppermost parts of the intestines closest to other parts of the viscera set is still visible. The rest of the intestines may still be connected thereto, but may also have been pulled or cut off.

Here the gripping member 3 is illustrated as tong-like tool with a pair of rods 31 on one side of the intestines and a single rod 32 on the other side pressing against each other to fixate the intestines, but other embodiments are possible as will be readily imaginable to the skilled person.

Still referring to FIGS. 3 and 4, a guide member 4 has been brought in between the gripping member 3 and the liver 16 and the gizzard 17. Here the guide member comprises two parts 41,42 each having a recess in the side facing the other part, so that when arranged closely together as shown in FIG. 4, they form an elongate opening 43 encircling the intestines. In operation the guide member is preferably part of the guide assembly mounted on a carrousel rotating about a vertical axis, so that the guide member may be rotated in underneath the viscera conveyor and then closed around the intestines, possibly combined with a displacement of the guide member in a radial direction in relation to the carrousel.

It is also possible to have only a recess in one of the two parts or to use a simpler plate member (not shown) with an opening in the middle and where the intestines are simply passed through the opening. In still another embodiment the guide member is forked, so that the elongate opening is in the form of a recess opening into the side of the guide member as indicated by the dash-dotted lines 43' in FIG. 4. Such a guide member may be displaced in a horizontal or inclined plane as indicated by the arrows A and B, respectively, in FIG. 3, thereby coming in around the intestines from the side, so that the intestines 15 of the viscera are located in the recess. It is, however, also possible to swing the guide member as shown by the arrow C about a horizontal axis 40, which is substantially parallel to the direction of travel of the viscera conveyor, i.e. perpendicular to the plane of the paper in FIG. 3, so that the guide member comes in around the intestines from the side and from below. This of course necessitates the provision of a pivot and an activation mechanism (not shown), which will not be described in detail as it is straightforward for the skilled person.

The opening and closing motion of a guide member having two parts 41,42 and the displacement A, B or swinging C described with reference to the forked guide member may be combined, so that the two parts are brought towards each other either during or after the displacement or swing. Likewise, the inwards motion of the guide member towards the viscera set may be a combined motion including both linear and curved section(s) achieved by displacement and swinging, respectively.

As will be seen, the guide member 4, which is here plate-shaped and substantially rectangular, is arranged at an angle α of approximately 30 degrees above horizontal, and having a surface area, which is somewhat larger than the area covered by the liver 16 and the gizzard 17, when seen from the front as in FIG. 4.

Figure 5:
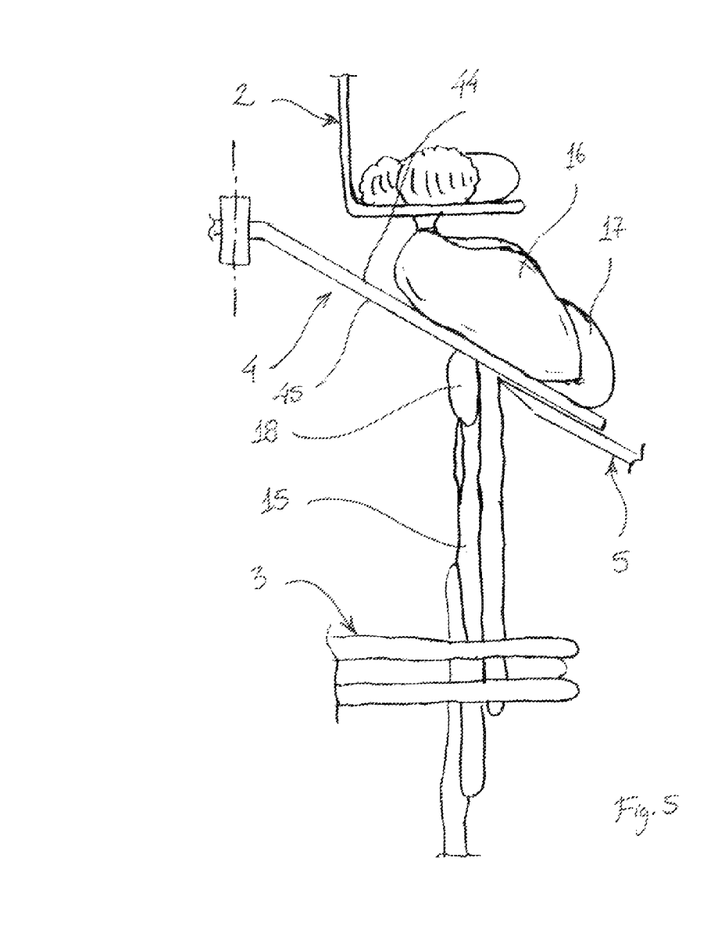
Figure 6:
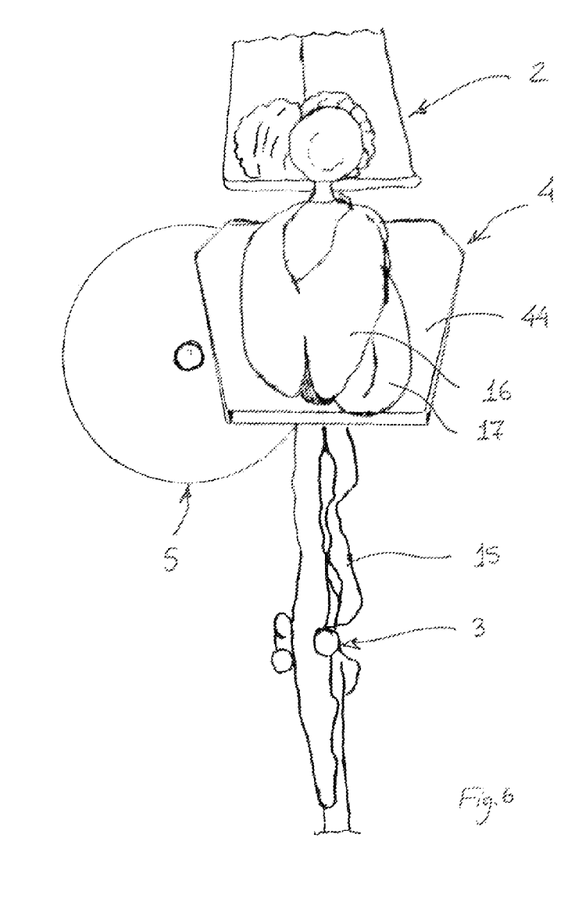

Turning now to FIGS. 5 and 6, the viscera holder 2 and the guide member 4 has been brought closer together so that the liver 16 and gizzard 17 are resting on the upper separation support surface 44 of the guide member. This may be done by lowering the viscera holder and/or by raising the guide member as will be described later. It will usually be preferred to only raise the guide member, since the viscera holder is usually running on an overhead conveyor, which may then run in a straight horizontal plane past the separating system.

The angled position of the guide member 4 and the size of the opening 43 therein are of importance to the efficiency of the process.

The angle allows the liver 16 and gizzard 17 to slide downwards along the opening 43, whereby the gall bladder 18 is loosened from the liver and the viscera set turns into an optimal position for separation. This sliding movement may be simply under the influence of gravity, but it is also possible to cause a slightly oscillating movement by moving the viscera holder 2 and guide member 4 in relation to each other, thereby facilitating the reorientation of the liver, gizzard and gall bladder. The reorientation of the liver and gizzard on the separation support surface also means that they are arranged in a well-defined manner, which may be advantageous for a later separation of these from each other and from the remaining parts of the viscera set.

The stretching of the intestines 15, either by the gripping member 3 or by gravity, has caused the viscera set to slide to the lowermost end of the elongate opening and the gall bladder 18, which was previously hidden underneath the liver, to have passed through the opening 43 and become exposed on the underside 45 of the guide member. Consequently, the gall bladder 18 can easily be separated from the remaining parts of the viscera set together with the intestines 15, for example by means of a rotating blade 5 arranged substantially in parallel with the underside 45 of the guide member. It is, however, also possible to use other types of cutters or to simply pull the intestines and gall bladder off, even though pulling involves an increased risk of rupturing the gall bladder and/or damaging the liver. Another option is to make the two parts 41,42 of the guide member without recesses. When closing them entirely, the intestines and gallbladder will then either be fixated so that they may be pulled off, possibly using the gripping member, or, if one or both of the two parts has a sharp edge, they will be cut off directly. Sharp edges require a very precise control of the operation to avoid unintentional cutting of e.g. the liver lobes during the initial closing of the guide member, but minimizes the number of components used in the separating system.

The gripping member 3 may actively pull on the intestines 15 or simply fixate them, such that an upwards movement of the guide member causes the intestines to be stretched. In the embodiment in the drawing, the intestines are arranged vertically, but it may prove advantageous to arrange them in a direction, which is substantially perpendicular to the separation support surface 44. The direction of intestines may also be changed during the process by changing the mutual position of the gripping member and guide member and/or the angle of one or both of them. The force applied to stretch the intestines may also change, ultimately resulting in an oscillating movement of the intestines. The exact angles and forces resulting in an optimal positioning of the intestines 15, gallbladder 18 and liver 16 in relation to the guide member 4 will depend on numerous factors such as the angle of the separation support surface 44, the size and shape of the opening 43 and the nature of the viscera sets being processed.

Since the viscera set 1 is still held in the viscera holder 2, the opening 43 in the separation support surface can be relatively large, possibly al-lowing the spleen (not shown) to also pass through the opening and be separated together with the intestines 15 and gall bladder 18. Care should, however, be taken that particularly parts of the liver, which is relatively fragile, do not pass through the opening, where it may be cut off. When processing chicken viscera sets, a width of the opening of 13-14 mm is presently believed to be optimal, while the length of the opening is approximately 10 cm.

To avoid damages to the liver the guide member 4 has a relatively large surface area, thereby preventing lobes of the liver from hanging over the edges.

Figure 7:
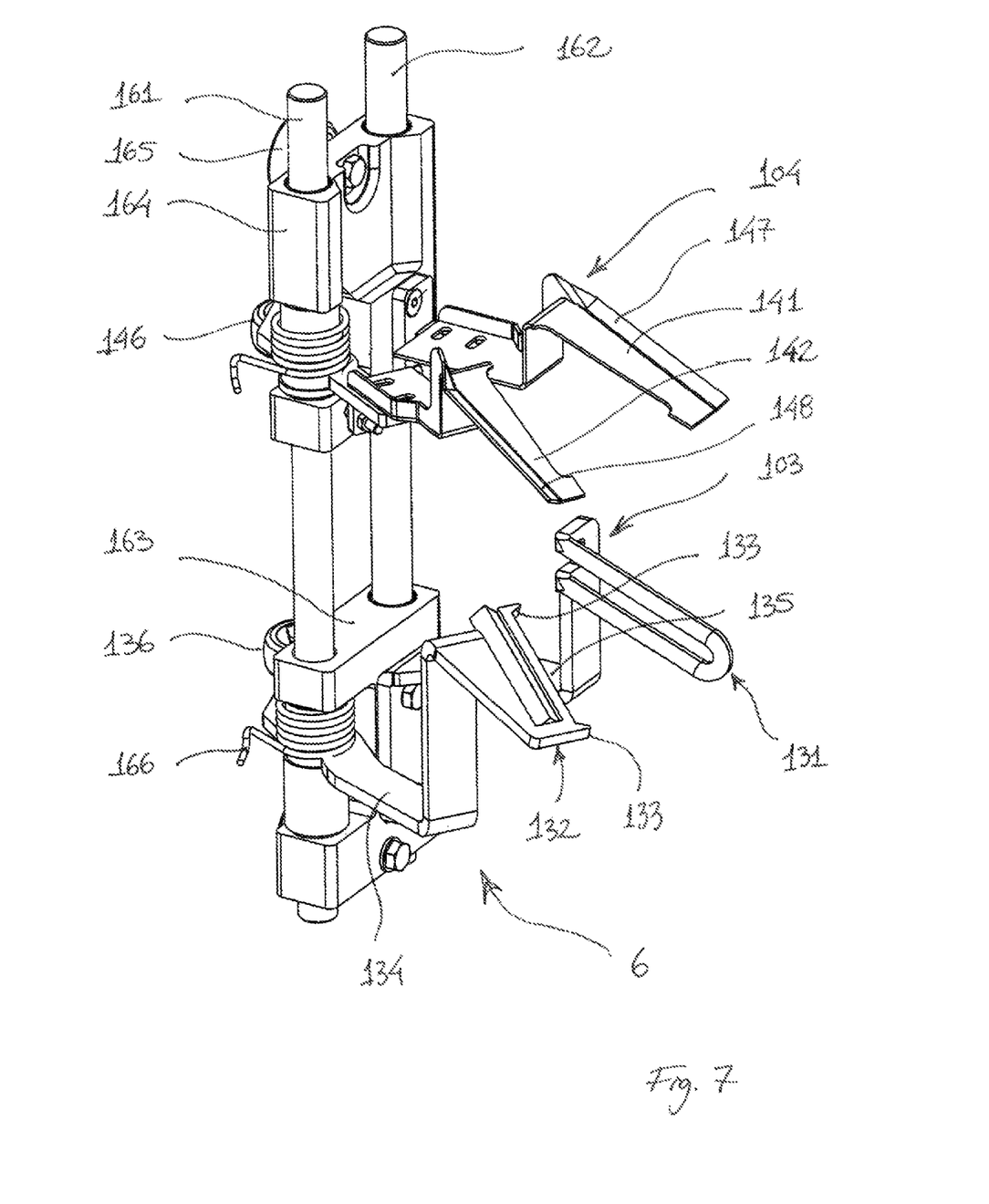
FIG. 7 is a perspective view of a guide assembly for separating poultry viscera sets in an open position, FIG. 8 corresponds to FIG. 7, but with the guide assembly in a closed position.
Figure 8:
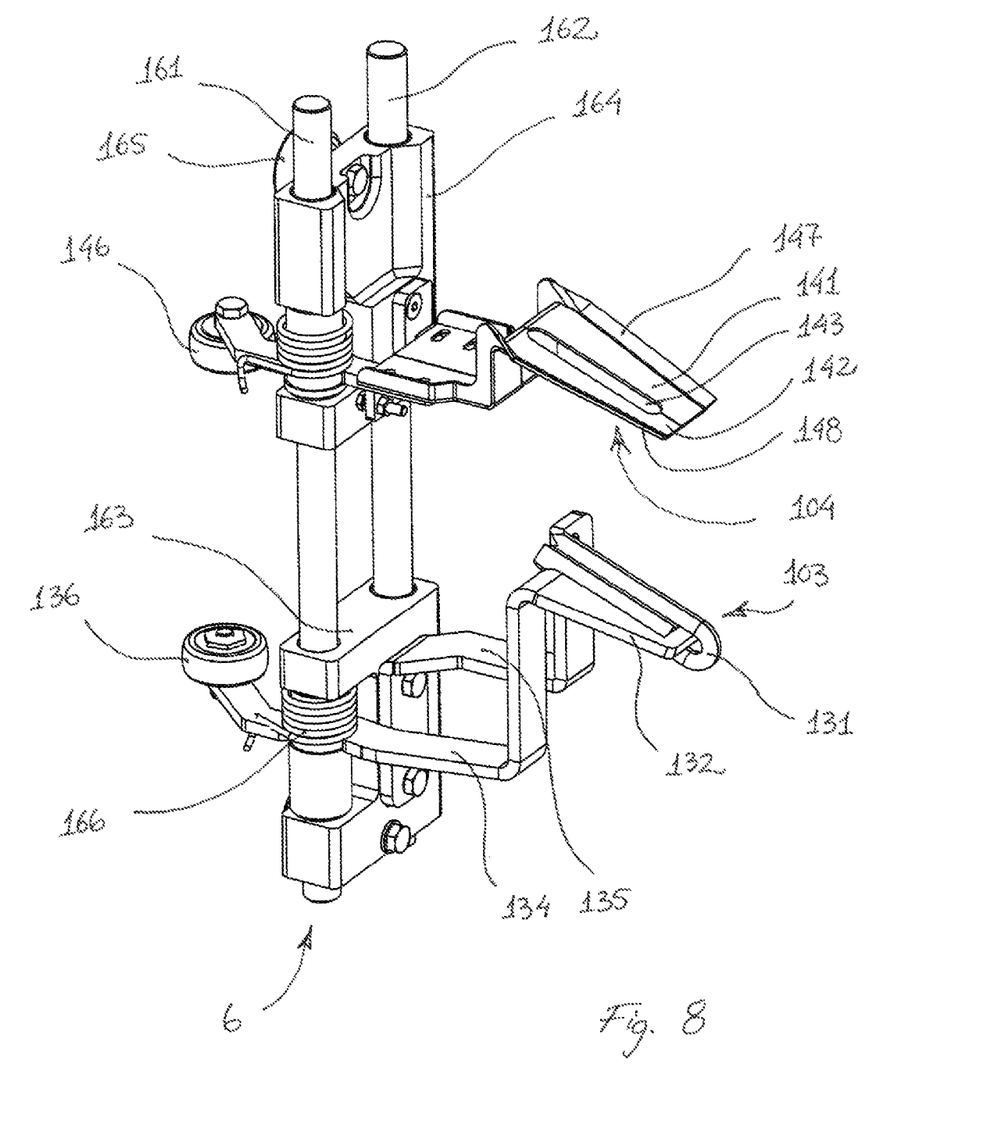

Turning now to FIGS. 7 and 8, an embodiment of a guide assembly 6 including a gripping member 103 and a guide member 104 is shown. In this embodiment the same reference numbers have been used for features having the same or analogue function as described with reference to FIGS. 1-6. Such features will generally not be described in further detail with reference to this embodiment.

The gripping member 103 and guide member 104 are mounted on an assembly frame including a pair of rods 161,162 having a round cross-section as will be described in detail below. These rods are intended for being attached to a carrousel type processing station as is well known to the skilled person, thereby allowing the guide assembly 6 to travel along side an overhead viscera conveyor, the rods being substantially vertical. If the conveyor turns at the carrousel with a radius of curvature corresponding substantially to the radius of the carrousel, the guide assembly and viscera holders on the conveyors will travel substantially in parallel over a section of the conveyor.

The gripping member 103 is attached to the rods 161,162 via a first base member 163 and the guide member 104 is attached via a second similar base member 164. A wheel 165 on the back side of the second base member is adapted for travelling in a guide track (not shown) on the apparatus. When the guide track has an upwards inclination, the wheel and hence also the base member will be forced upwards, the base member sliding up along the rods, and vice versa when the guide track has a downwards inclination. In this embodiment, only the second base member 164 is provided with a wheel 165, while the first base member is stationary, but it is to be understood that both may be moveable or that the first may be moveable and the second stationary. Any of these embodiments will provided the mutual change of position of the gripping member and the guide member described above with reference to FIGS. 1-6.

The gripping member 103 here includes a U-shaped brace member 131 and a plate member 132 having pointed projections 133 serving to fixate the intestines in the length direction of the brace member. Both the brace member and the plate member are mounted on arms 134,135, which are again connected to the rods 161,162. Here the arm 134 carrying the plate member 133 is connected directly to one of the rods 161 and able to turn about the length axis of the rod, whereas the arm 135 carrying the brace member 131 is attached to the base member 163 and hence not able to turn.

A spring 166 on the base member 163 forces the arm 134 towards the open position. When the plate member 133 is to be turned to the closed position a wheel 136 at the opposite end of the arm 134 is brought into engagement with a stop (not shown) and is thus forced to the side against the pressure of the spring. The stop may for example be provided on an apparatus frame together with the guide tracks mentioned above.

The guide member 104 is built and operated in a similar manner. Two parts 141,142 forming a separation support surface 144 as described above are shown in an open position in FIG. 7, and in FIG. 8 the second part 142 has been moved towards the first part 141 by the wheel 146 engaging a stop. Recesses in the sides of the two parts 141,142 form an opening 143 adapted for encircling the intestines as described above. In this embodiment, the two parts are further provided with upstanding flanges 147,148 adapted for keeping particularly the liver 16 in place on the separation support surface and prevent liver lobes from being cut off unintentionally. As may be seen the separation support surface is slightly wedge-shaped and most narrow at the lower end. This helps the viscera set to reach the desired orientation when sliding down the separation support surface.

In another embodiment of the guide member, the two parts are displaced in relation to each other in a direction perpendicular to the separation support surface, so that one is somewhat below the other, thereby potentially avoiding unintentional clamping or cutting of the intestines between the two parts.

In still another embodiment one or both parts are inclined so that either the edge facing the other part or the edge facing away from it is raised, thereby making the separation support surface either convex or concave. Likewise, a one-part guide member may be inclined so that either the leading edge or the trailing edge when seen in the direction of travel of the guide assembly and/or viscera conveyor is raised in relation to the other. Such inclinations may facilitate the positioning of the viscera set on the guide member.

It is noted that though the invention has here been described with reference to embodiments having both a guide member and a gripping member, the gripping member might in principle be dispensed with, simply relying on gravity to pull the intestines down. This also implies that the guide member may be designed independently of the design of the gripping member and vice versa and that the combinations described above are therefore only to be regarded as non-limiting examples. For example it is noted that flanges at the sides of the support surface may be used on all embodiment of the guide member and that the shape of the support surface may be rectangular, wedge-shaped or having a different shape independently of the other features of the guide member.

Figure 9:
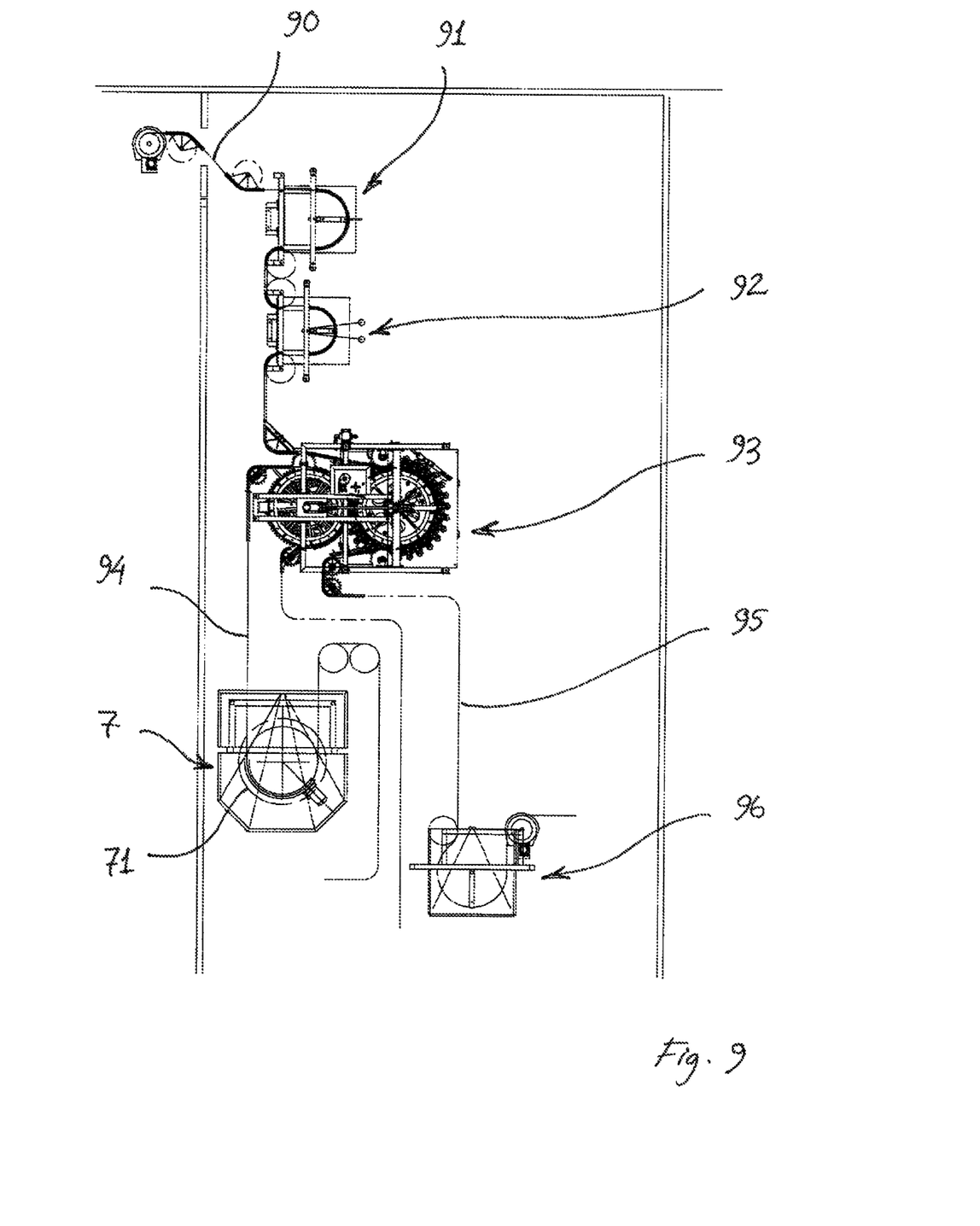
FIG. 9 is a schematic illustration of the layout of a section of a poultry slaughter house including a system according to the invention.

The guide assembly 6 is part of a system 7 for separating viscera sets eviscerated from slaughtered poultry and this system in turn is intended for use in a poultry slaughter house, where it is arranged in series with other poultry processing systems. An example of the layout of a section of a poultry slaughter house including a system 7 according to the invention is shown in FIG. 9. Poultry (not shown), which has previously been stunned or killed and hung from the legs on an overhead conveyor 90, enters this section of the slaughter house at the upper left-hand corner in FIG. 9. From here the birds are first taken to a vent cutter 91 and then to an opening machine 92, before being eviscerated in an eviscerator 93. The viscera sets (not shown in FIG. 9) are conveyed away from the eviscerator on a viscera conveyor 94 to the sys-tem 7 according to the invention, while the carcasses are conveyor on a separate conveyor 95 to a cropping station 96. Further processing stations of known types may be provided further downstream on the viscera and carcass conveyors, but are not shown or described here.

The viscera set separating system 7 is here of the carrousel type with guide assemblies 6 distributed evenly along its periphery 71. The guide assemblies are arranged at the same mutual distance as the distance between viscera holders 2 on the viscera conveyor 94 and the carrousel is running at substantially the same speed as the conveyor. When passing the separating system 7 the viscera conveyor 94 performs a 180 degree turn, meaning that the viscera holders on the conveyor and the guide assemblies on the separating system run in parallel over approximately half the circumference of the carrousel. The fact that the guide assemblies move together with the viscera holder means that the impacts resulting from a moving viscera set on a viscera conveyor meeting a guide assembly are minimized.

For a guide assembly including a two-part guide member as de-scribed above the guide member is thus potentially moveable in three ways: It may move up and down in relation to the viscera holder as shown in FIGS. 3-6, the two parts may move between the open and the closed position as shown in FIGS. 7-8 and it may move with the guide assembly in parallel with the viscera conveyor as shown in FIG. 9. One of these ways of movement will in principle be sufficient to provide an advantage over the prior art, but further advantages are achieved by combining two or more of them.

The invention claimed is:

1. A method for separating a viscera set eviscerated from slaughtered poultry, said viscera set including a gizzard, liver, intestines and gallbladder and being held by a viscera holder on a viscera conveyer in a manner wherein at least the liver, the intestines and the gallbladder are suspended below said viscera holder, said method comprising the steps of:
   arranging said viscera set in an elongate opening of a guide member in a manner wherein the intestines and the gallbladder are suspended below said guide member and the liver and gizzard are positioned above said guide member; and
   separating the intestines and the gallbladder from the remaining viscera set,
   moving the guide member during one or both of the above arranging and separating steps,
   separating the intestines and the gallbladder from the remaining viscera set while at least said liver rests on a separation support surface of said guide member, and
   arranging said separation support surface with an angle relative to a horizontal plane at least during the separating of the intestines and the gallbladder from the remaining viscera set.

2. The method according to claim 1, further comprising angling said separation support surface relative to the horizontal plane with an angle between 5 degrees and 85 degrees.

3. The method according to claim 1, wherein the step of arranging said viscera set in said elongate opening of said guide member comprises:
   arranging the viscera holder at a first distance above the guide member; and
   moving said guide member and/or said viscera holder so that they are arranged with a second distance, smaller than said first distance, wherein said liver is supported by a separation support surface of said guide member.

4. The method according to claim 3, further comprising moving said guide member and said viscera holder towards each other by keeping the viscera holder substantially in the same horizontal plane and moving said guide member upwards.

5. The method according to claim 1, wherein said moving comprises moving said guide member and said viscera holder as a pair at least for a distance.

6. The method according to claim 5, wherein said guide member comprises a first part and a second part, the method further comprising receiving said viscera set by the guide member with the first part and the second part in a first position, wherein said first part and said second part are relatively far apart, and subsequently moving said first part and said second part to a second position, in which the first part and the second part are closer to each other than when in the first position.

7. The method according to claim 1, wherein the step of arranging said viscera set in said elongate opening of said guide member comprises gripping a first part of the intestines suspended below said guide member by a gripping member.

8. The method according to claim 7, further comprising performing a first vertical movement by the gripping member wherein the intestines are pulled further through the elongate opening of the guide member.

9. The method according to claim 1, wherein the separating the intestines and the gallbladder from the remaining viscera set is accomplished by at least one process chosen from the group consisting of:
- cutting with a blade positioned below said guide member;
- moving edges of the elongate opening of the guide member together like scissors; and
- pulling on the intestines and/or gallbladder.

10. The method according to claim 1, further comprising angling said separation support surface relative to the horizontal plane with an angle between 15 degrees and 60 degrees.

11. A system for separating viscera sets including a gizzard, liver, intestines and gallbladder and being eviscerated from slaughtered poultry, said system comprising:
- a guide member and a viscera conveyer comprising a plurality of viscera holders, wherein each viscera holder is configured to hold a viscera set so that at least the liver, the intestines, and the gallbladder are suspended below said viscera holder, and said guide member comprises a separation support surface having an elongate opening configured to receive a viscera set held by one of the viscera holders so that the intestines and the gallbladder are suspended below said guide member and the liver and gizzard are positioned above said guide member;
- wherein said system is configured to separate the intestines and the gallbladder from the remaining viscera set,
- wherein said guide member is moveable relative to other parts of the system,
- wherein said system is configured to separate the intestines and the gallbladder from the remaining viscera set while at least said liver rests on the separation support surface of said guide member, and
- wherein said separation support surface is arrangeable with an angle relative to a horizontal plane.

12. The system according to claim 11, wherein said separation support surface is angled relative to the horizontal plane with an angle between 5 degrees and 85 degrees.

13. The guide assembly according to claim 12, wherein said guide assembly further comprises an assembly frame and wherein said guide member is arranged to be vertically moveable on said assembly frame between a first vertical position adapted for receiving a viscera set and a second vertical position above said first vertical position.

14. The guide assembly according to claim 13, wherein the guide assembly further comprises a gripping member arranged on said assembly frame below said guide member for gripping a part of the intestines suspended below said guide member.

15. The system according to claim 11, wherein said guide member comprises a first part and a second part, said first and second parts being moveable between a first open position in which said guide member is configured to receive said viscera set with said first part and said second part spaced relatively far apart, and a second closed position in which the first part and the second part are spaced closer to each other than when in the first open position.

16. The system according to claim 11, wherein said system is configured so that the guide member and one of the viscera holders are spaced apart a first distance in which the guide member is adapted for receiving the viscera set, and spaced a second distance in a position in a which the liver may rest on the separation support surface of said guide member, said second distance being smaller than said first distance.

17. The system according to claim 16, wherein said viscera holders are adapted for moving substantially in the same horizontal plane and wherein said guide member is adapted for being moved upwards towards one of the viscera holders.

18. The system according to claim 11, wherein the system further comprises a plurality of gripping members and a plurality guide members, wherein each gripping member is configured to move with a particular one of the guide members to grip a first part of the intestines suspended below said particular guide member.

19. The system according to claim 18, wherein each gripping member is configured to perform a downward displacement to pull the intestines further through the elongate opening of the guide member.

20. A system according to claim 11, wherein said separation support surface is angled relative to the horizontal plane with an angle between 15 degrees and 60 degrees.

21. A guide assembly for use in a system for separating viscera sets, including a gizzard, liver, intestines and gallbladder, eviscerated from slaughtered poultry, said guide assembly comprising:
- a guide member comprising a separation support surface having an elongate opening for receiving a viscera set so that at least the intestines and the gallbladder are suspended below said guide member and the liver and gizzard are positioned above said guide member,
- wherein said separation support surface of said guide member is arrangeable with an angle relative to a horizontal plane, and said guide member comprises a first part and a second part, and
- wherein said first part and second part are movable between a first position for receiving a viscera set in which said first part and said second part are spaced relatively far apart, and a second position in which the first part and the second part are spaced closer to each other relative to the first position.

22. A combination of a system for separating viscera sets eviscerated from slaughtered poultry according to claim 11, and a guide assembly for use in said system, the guide assembly comprising:
- a guide member comprising a separation support surface having an elongate opening for receiving a viscera set so that at least the intestines and the gallbladder are suspended below said guide member and the liver and gizzard are positioned above said guide member,
- wherein said separation support surface of said guide member is arrangeable with an angle relative to a horizontal plane, and said guide member comprises a first part and a second part, and
- wherein said first part and second part are movable between a first position for receiving a viscera set in which said first part and said second part are spaced relatively far apart, and a second position in which the first part and the second part are spaced closer to each other relative to the first position.

* * * * *